(12) United States Patent
Chang et al.

(10) Patent No.: US 9,774,664 B2
(45) Date of Patent: Sep. 26, 2017

(54) SOCIAL NETWORKING SYSTEM BASED ON SMART CLOTHING

(71) Applicant: NATIONAL TAIWAN NORMAL UNIVERSITY, Taipei (TW)

(72) Inventors: Chun-Yen Chang, Taipei (TW); Charles Tijus, Taipei (TW); Wei-Kai Liou, Taipei (TW)

(73) Assignee: National Taiwan Normal University, Taipei (TW)

( * ) Notice: Subject to any disclaimer, the term of this patent is extended or adjusted under 35 U.S.C. 154(b) by 18 days.

(21) Appl. No.: 14/726,730

(22) Filed: Jun. 1, 2015

(65) Prior Publication Data
US 2016/0234294 A1    Aug. 11, 2016

(30) Foreign Application Priority Data
Feb. 11, 2015   (TW) .............................. 104104603 A

(51) Int. Cl.
G06F 15/16    (2006.01)
H04L 29/08    (2006.01)
(Continued)

(52) U.S. Cl.
CPC .............. *H04L 67/10* (2013.01); *G06Q 50/01* (2013.01); *G09B 7/02* (2013.01); *G09B 7/07* (2013.01); *H04L 67/38* (2013.01)

(58) Field of Classification Search
CPC ........... H04L 67/10; H04L 67/38; G09B 7/02; G09B 7/07
(Continued)

(56) References Cited

U.S. PATENT DOCUMENTS

| 2003/0090598 A1 | 5/2003 | Johngren et al. |
| 2012/0158633 A1 | 6/2012 | Eder |
| 2014/0171749 A1 | 6/2014 | Chin et al. |

FOREIGN PATENT DOCUMENTS

| TW | M425536 U1 | 4/2012 |
| TW | M430256 U1 | 6/2012 |

OTHER PUBLICATIONS

Li et al; Wearable Sensors in Intelligent Clothing for Measuring Human Body Temperature based on Optical Fiber Bragg Grating; Mar. 14, 2012; pp. 1-14.*

(Continued)

*Primary Examiner* — Glenford Madamba
(74) *Attorney, Agent, or Firm* — Rosenberg, Klein & Lee

(57) ABSTRACT

The invention discloses a social networking system which includes a main data processing apparatus, a plurality of smart clothing apparatus and a plurality of sub-data-processing apparatuses. Each smart clothing apparatus includes a light-emitting device assembly. Each sub-data-processing apparatus corresponds to one of the smart clothing apparatuses. The main data processing apparatus transmits an inquiry information to each sub-data-processing apparatus. The inquiry information includes a plurality of selection data and a plurality of light color data. Each selection datum corresponds to one of the light color data. Each sub-data-processing apparatus receives the inquiry information, displays the plurality of selection data, and transmits, responsive to a selection signal corresponding to one of the selection data, the light color datum corresponding to said one selection datum to the corresponding smart clothing apparatus. The corresponding smart clothing apparatus drives the light-emitting device assembly thereof to emit at least one color light in accordance with the received light color datum.

7 Claims, 2 Drawing Sheets

(51) Int. Cl.
  *H04L 29/06* (2006.01)
  *G06Q 50/00* (2012.01)
  *G09B 7/02* (2006.01)
  *G09B 7/07* (2006.01)

(58) Field of Classification Search
  USPC .......................................................... 709/219
  See application file for complete search history.

(56) References Cited

OTHER PUBLICATIONS

McManus et al; 10 Smart Clothes You'll Be Wearing Soon; Apr. 13, 2010; pp. 1-20.*
Boxall et al; Is This What It's Like to Have Cleavage? We Donned A Smart T-Shirt With 896 LEDs; Aug. 10, 2014; pp. 1-10.*
Kan et al; Social Textiles: Social Affordances and Icebreaking Interactions Through Wearable Social Messaging; Jan. 2015; TEI; pp. 619-624.*

* cited by examiner

SOCIAL NETWORKING SYSTEM BASED ON SMART CLOTHING

CROSS-REFERENCE TO RELATED APPLICATION

This utility application claims priority to Taiwan Application Serial Number 104104603, filed Feb. 11, 2015, which is incorporated herein by reference.

BACKGROUND OF THE INVENTION

1. Field of the Invention

This present invention relates to a social networking system, and more particularly, to a social networking system available for interactive learning in a classroom.

2. Description of the Prior Art

The public all understand that interaction among teachers and students should be emphasized first for learning in classrooms. Along with the approach in digital times, how to make use of digital science and technology to create interaction among teachers and student in classrooms to promote teaching motive and efficiency has been a pressing education subject.

There is presently no systems which make teachers and students see at a glance learning conditions and opinion distribution of all students and provide the teacher with correction for learning methods in real-time or carrying on different kinds of group discussion. If there is this kind of system, the teacher can use this system to further utilize the students' answers, or design diverse teaching activities in accordance with the color change on the students' clothing based on students' answers, and effectively promote the motive and learning efficiency that the students learn.

SUMMARY OF THE INVENTION

Accordingly, a scope of the invention is to provide a social networking system. In particular, the social networking system of the invention is available for interactive learning in a classroom, and can use different colors to immediately show the inquiry results among teachers and students.

According to the first preferred embodiment of the invention, a social networking system includes a main data processing apparatus, a plurality of smart clothing apparatuses and a plurality of sub-data-processing apparatuses. Each smart clothing apparatus includes a respective textile article, a respective light-emitting device assembly and a respective control unit. The light-emitting device assembly is mounted on the textile article. The control unit is mounted on the textile article and electrically connected to the light-emitting device assembly, and includes a signal receiver. Each sub-data-processing apparatus is capable of communicating with the main data processing apparatus and corresponds to one of the smart clothing apparatuses. The main data processing apparatus transmits an inquiry information to each sub-data-processing apparatus. The inquiry information includes a plurality of selection data and a plurality of light color data, where each selection datum corresponds to one of the light color data. Each sub-data-processing apparatus receives the inquiry information, displays the plurality of selection data, and transmits, responsive to a selection signal corresponding to one of the selection data, the light color datum corresponding to said one selection datum to the corresponding control unit. The corresponding control unit receives the light color datum through the signal receiver thereof, and drives the connected light-emitting device assembly to emit at least one color light in accordance with the received light color datum.

According to the second preferred embodiment of the invention, a social networking system includes a server, a main data processing apparatus, a plurality of smart clothing apparatuses and a plurality of sub-data-processing apparatuses. The main data processing apparatus is linked to the server through a network. Each smart clothing apparatus includes a respective textile article, a respective light-emitting device assembly and a respective control unit. The light-emitting device assembly is mounted on the textile article. The control unit is mounted on the textile article and electrically connected to the light-emitting device assembly, and includes a signal receiver. Each sub-data-processing apparatus is linked to the server through the network, and corresponds to one of the smart clothing apparatuses. The main data processing apparatus transmits an inquiry information to the server. Each sub-data-processing apparatus downloads the inquiry information from the server. The inquiry information includes a plurality of selection data and a plurality of light color data, where each selection datum corresponds to one of the light color data. Each sub-data-processing apparatus receives the inquiry information, displays the plurality of selection data, and transmits, responsive to a selection signal corresponding to one of the selection data, the light color datum corresponding to said one selection datum to the corresponding control unit. The corresponding control unit receives the light color datum through the signal receiver thereof and drives the connected light-emitting device assembly to emit at least one color light in accordance with the received light color datum.

In practical application, each light-emitting device assembly can include a light-emitting device, an organic light-emitting device, an electro-luminescent light device, or other kind of light-emitting device.

In one embodiment, each sub-data-processing apparatus transmits the light color datum in a Bluetooth protocol, a Wi-Fi protocol, an LTE protocol, IEEE 802.11-based protocols, a Zigbee protocol, a Z-wave protocol, or other commercial short distance communication protocol.

In another embodiment, each sub-data-processing apparatus transmits the light color datum in an infrared signal way or a radiation signal way.

Different from the prior arts, the social networking system of the invention is available for interactive learning in a classroom, and can immediately control the light-emitting device assemblies on the smart clothing apparatuses of the invention to emit corresponding color lights that make the teachers and the students quickly set groups according positive and negative opinions or particular conditions in accordance with instant feedback opinions in class. The social networking system of the invention can make the teachers and students see at a glance learning conditions and opinion distribution of all students, and provide the teacher with correction for learning methods in real-time or carrying on different kinds of group discussion. The teacher can use the social networking system of the invention to further utilize the students' answers, or design diverse teaching activities in accordance with the light color change on the students' clothing based on students' answers, and effectively promote the motive and learning efficiency that the students learn in digital way.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
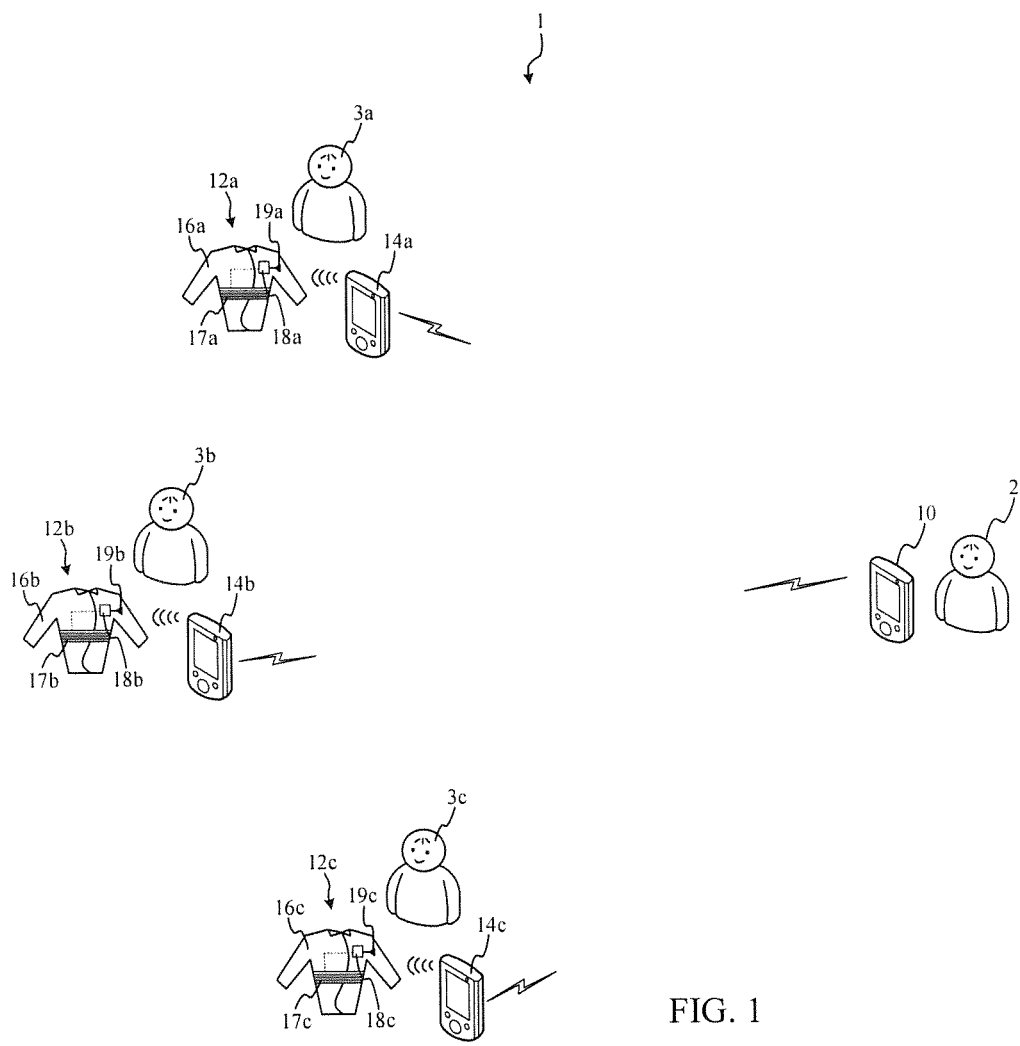
FIG. 1 is a schematic diagram showing the architecture of the social networking system according to the first preferred embodiment of the invention.

Referring to FIG. 1, FIG. 1 schematically shows the architecture of the social networking system 1 according to the first preferred embodiment of the invention.

As shown in FIG. 1, the social networking system 1 includes a main data processing apparatus 10, a plurality of smart clothing apparatuses (12a, 12b and 12c) and a plurality of sub-data-processing apparatuses (14a, 14b and 14c). To illustrate conveniently, in FIG. 1, only three smart clothing apparatuses (12a, 12b and 12c) and three sub-data-processing apparatuses (14a, 14b and 14c) are illustrated for representation. In practical application, the main data processing apparatus 10 can be a mobile phone, a notebook computer, a tablet computer, a desktop computer, or other apparatus with computation capability, especially, a mobile data-processing apparatus is preferred. Each sub-data-processing apparatuses (14a, 14b and 14c) can be a mobile phone, a notebook computer, a tablet computer, a desktop computer, or other apparatus with computation capability, especially, a handheld data-processing apparatus is preferred.

Each smart clothing apparatus (12a, 12b and 12c) includes a respective textile article (16a, 16b and 16c), a respective light-emitting device assembly (17a, 17b and 17c) and a respective control unit (18a, 18b and 18c). The light-emitting device assembly (17a, 17b and 17c) is mounted on the textile article (16a, 16b and 16c). The control unit (18a, 18b and 18c) is mounted on the textile article (16a, 16b and 16c) and electrically connected to the light-emitting device assembly (17a, 17b and 17c).

Each control unit (18a, 18b and 18c) includes a signal receiver (19a, 19b and 19c). Each sub-data-processing apparatus (14a, 14b and 14c) is capable of communicating with the main data processing apparatus 10, and corresponds to one of the smart clothing apparatuses (12a, 12b and 12c).

As shown in FIG. 1, the main data processing apparatus 10 can be operated by an asker 2 to transmit an inquiry information to each sub-data-processing apparatus (14a, 14b and 14c). The inquiry information includes a plurality of selection data and a plurality of light color data, where each selection datum corresponds to one of the light color data.

As shown in FIG. 1, each sub-data-processing apparatus (14a, 14b and 14c) is respectively operated by one of a plurality of answerers (3a, 3b and 3c). Each sub-data-processing apparatus (14a, 14b and 14c) receives the inquiry information, and displays the plurality of selection data. Each answerer (3a, 3b and 3c) operates, according to the selection data displayed on the sub-data-processing apparatus (14a, 14b and 14c) transmit a selection signal corresponding to one of the selection data. Each sub-data-processing apparatus (14a, 14b and 14c) also transmits, responsive to the selection signal corresponding to one of the selection data, the light color datum corresponding to said one selection datum to the corresponding control unit (18a, 18b and 18c). The corresponding control unit (18a, 18b and 18c) receives the light color datum through the signal receiver (19a, 19b and 19c) thereof, and drives the connected light-emitting device assembly (17a, 17b and 17c) to emit at least one color light in accordance with the received light color datum. The social networking system of the invention is available for interactive learning in a classroom, and thereby, the inquiry results among teachers and students can be shown immediately by various light colors.

In practical application, each light-emitting device assembly (17a, 17b and 17c) can include a light-emitting device, an organic light-emitting device, an electro-luminescent light device, or other kind of light-emitting device.

In one embodiment, each sub-data-processing apparatus (14a, 14b and 14c) transmits the light color datum in a Bluetooth protocol, a Wi-Fi protocol, an LTE protocol, IEEE 802.11-based protocols, a Zigbee protocol, a Z-wave protocol, or other commercial short distance communication protocol.

In another embodiment, each sub-data-processing apparatus (14a, 14b and 14c) transmits the light color datum in an infrared signal way or a radiation signal way.

Further, each sub-data-processing apparatus (14a, 14b and 14c) sends said one selection datum to the main data-processing apparatus 10. The main data-processing apparatus 10 does statistics and analysis of the selection data of the answerers (3a, 3b and 3c).

Figure 2:
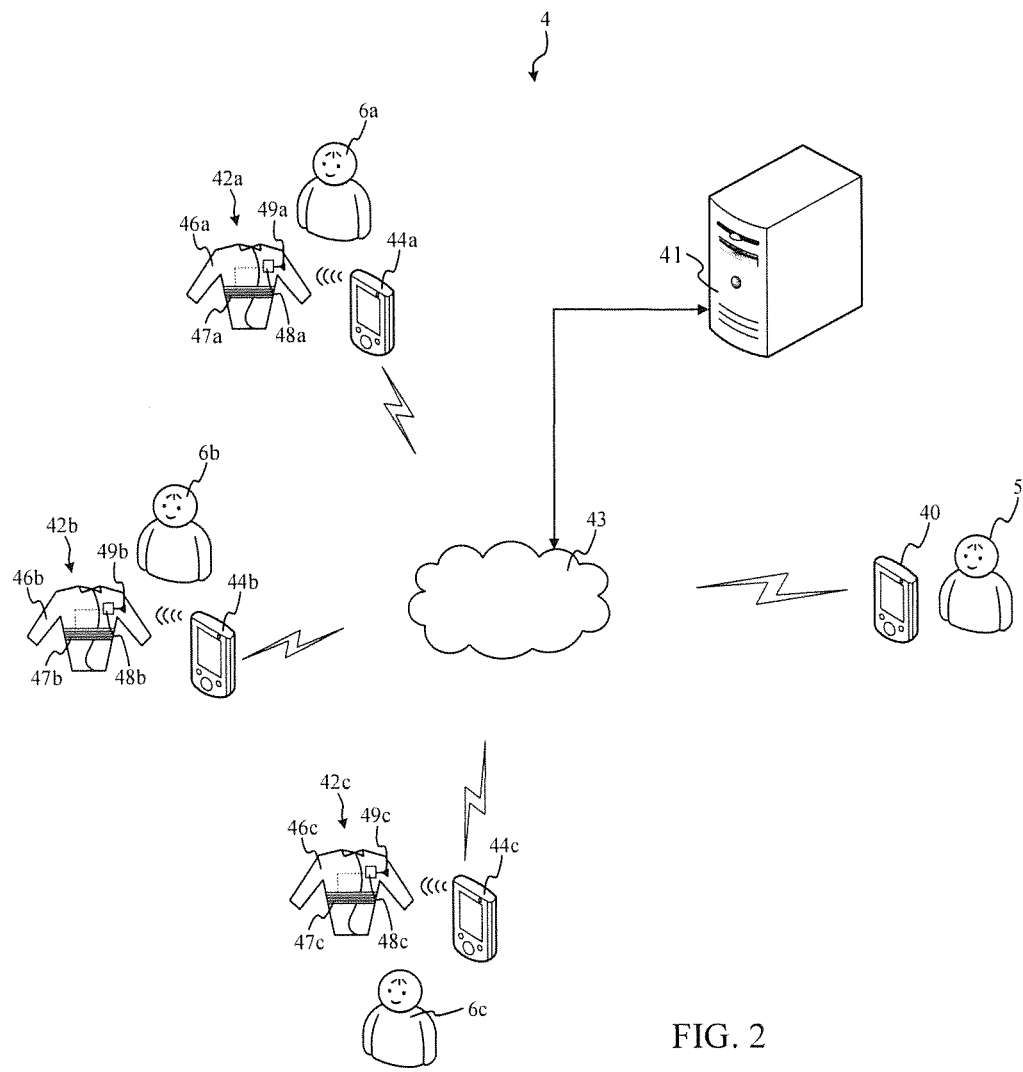
FIG. 2 is a schematic diagram showing the architecture of the social networking system according to the second preferred embodiment of the invention.

Referring to FIG. 2, FIG. 2 schematically shows the architecture of the social networking system 4 according to the second preferred embodiment of the invention.

As shown in FIG. 2, the social networking system 4 includes a server 41, a main data processing apparatus 40, a plurality of smart clothing apparatuses (42a, 42b and 42c) and a plurality of sub-data-processing apparatuses (44a, 44b and 44c). To illustrate conveniently, in FIG. 2, only three smart clothing apparatuses (42a, 42b and 42c) and three sub-data-processing apparatuses (44a, 44b and 44c) are illustrated for representation. In practical application, the main data processing apparatus 40 can be a mobile phone, a notebook computer, a tablet computer, a desktop computer, or other apparatus with computation capability, especially, a mobile data-processing apparatus is preferred. Each sub-data-processing apparatuses (44a, 44b and 44c) can be a mobile phone, a notebook computer, a tablet computer, a desktop computer, or other apparatus with computation capability, especially, a handheld data-processing apparatus is preferred.

The main data processing apparatus 40 is linked to the server through a network 43. Each smart clothing apparatus (42a, 42b and 42c) includes a respective textile article (46a, 46b and 46c), a respective light-emitting device assembly (47a, 47b and 47c) and a respective control unit (48a, 48b and 48c). The light-emitting device assembly (47a, 47b and 47c) is mounted on the textile article (46a, 46b and 46c). The control unit (48a, 48b and 48c) is mounted on the textile article (46a, 46b and 46c) and electrically connected to the light-emitting device assembly (47a, 47b and 47c).

Each control unit (48a, 48b and 48c) includes a signal receiver (49a, 49b and 49c). Each sub-data-processing apparatus (44a, 44b and 44c) is linked to the server 41 through the network 43, and corresponds to one of the smart clothing apparatuses (42a, 42b and 42c).

As shown in FIG. 2, the main data processing apparatus 40 can be operated by an asker 5 to transmit an inquiry information to the server 41. The inquiry information includes a plurality of selection data and a plurality of light color data, where each selection datum corresponds to one of the light color data.

As shown in FIG. 2, each sub-data-processing apparatus (44a, 44b and 44c) is respectively operated by one of a plurality of answerers (6a, 6b and 6c) to download the inquiry information from the server 41. Each sub-data-processing apparatus (44a, 44b and 44c) receives the inquiry information, and displays the plurality of selection data. Each answerer (6a, 6b and 6c) operates, according to the selection data displayed on the sub-data-processing apparatus (44a, 44b and 44c) transmit a selection signal corresponding to one of the selection data. Each sub-data-processing apparatus (44a, 44b and 44c) also transmits, responsive to the selection signal corresponding to one of the selection data, the light color datum corresponding to said one selection datum to the corresponding control unit (48a, 48b and 48c). The corresponding control unit (48a, 48b and 48c) receives the light color datum through the signal receiver (49a, 49b and 49c) thereof, and drives the connected light-emitting device assembly (47a. 47b and 47c) to emit at least one color light in accordance with the received light color datum. The social networking system 4 of the invention is available for interactive learning in a classroom, and thereby, the inquiry results among teachers and students can be shown immediately by various light colors.

In practical application, each light-emitting device assembly (47a, 47b and 47c) can include a light-emitting device, an organic light-emitting device, an electro-luminescent light device, or other kind of light-emitting device.

In one embodiment, each sub-data-processing apparatus (44a, 44b and 44c) transmits the light color datum in a Bluetooth protocol, a Wi-Fi protocol, an LTE protocol, IEEE 802.11-based protocols, a Zigbee protocol, a Z-wave protocol, or other commercial short distance communication protocol.

In another embodiment, each sub-data-processing apparatus (44a, 44b and 44c) transmits the light color datum in an infrared signal way or a radiation signal way.

Further, each sub-data-processing apparatus (44a, 44b and 44c) sends said one selection datum to the server 41. The server 41 does statistics and analysis of the selection data of the answerers (6a, 6b and 6c), and then send the statistical and analytical results to the main data-processing apparatus 40.

With the preferred embodiments and explanations above, we believe that the public all understand the invention integrates the light-emitting device assembly on the textile article and utilizes a wireless short distance communication technology as the control and communication ways between the sub-data-processing apparatus. The social networking system of the invention can practiced by use of various mobile and handheld data-processing apparatuses used in the classroom to achieve an immediate feedback system. The signal of inquiry results among the teachers and students, for example, right or wrong answers, learning degree or efficiency, different opinions or viewpoints, etc.), can immediately control the light-emitting device assembly on the textile article of the invention emit corresponding color lights that make the teachers and the students quickly set groups according positive and negative opinions or particular conditions in accordance with instant feedback opinions in class. The social networking system of the invention can make the teachers and students see at a glance learning conditions and opinion distribution of all students, and provide the teacher with correction for learning ways in real-time or carrying on different kinds of group discussion. The teacher can use the social networking system of the invention to further utilize the students' answers, or design diverse teaching activities in accordance with the light color change on the students' clothing based on students' answers, and effectively promote the motive and learning efficiency that the students learn in digital way.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A social networking system, comprising:
a main data processing apparatus;
a plurality of smart clothing apparatuses which each comprises:
a respective textile article;
a respective light-emitting device assembly being mounted on the textile article; and
a respective control unit being mounted on the textile article and electrically connected to the light-emitting device assembly, and comprising a signal receiver; and
a plurality of sub-data-processing apparatuses which each is capable of communicating with the main data processing apparatus and corresponds to one of the smart clothing apparatuses;
wherein the main data processing apparatus is operated by an asker to wireless transmit an inquiry information to each sub-data-processing apparatus, the inquiry information comprises a plurality of selection data and a plurality of light color data, each selection datum corresponds to one of the light color data, each sub-data-processing apparatus receives the inquiry information, displays the plurality of selection data, and is operated by one of a plurality of answerers to transmit in a short distance communication protocol, responsive to a selection signal corresponding to one of the selection data, the light color datum corresponding to said one selection datum to the corresponding control unit, the corresponding control unit receives the light color datum through the signal receiver thereof and drives the connected light-emitting device assembly to emit at least one color light in accordance with the received light color datum, the short distance communication protocol is one selected from the group consisting of a Bluetooth protocol, a Wi-Fi protocol, an LTE protocol, IEEE 802.11-based protocols, a Zigbee protocol, and a Z-wave protocol.

2. The social networking system of claim 1, wherein each light-emitting device assembly comprises one selected from the group consisting of a light-emitting device, an organic light-emitting device and an electro-luminescent light device.

3. The social networking system of claim 1, wherein each sub-data-processing apparatus transmits the light color datum in an infrared signal way or a radiation signal way.

4. A social networking system, comprising:
a server;
a main data processing apparatus, linked to the server through a network;
a plurality of smart clothing apparatuses which each comprises:
a respective textile article;
a respective light-emitting device assembly being mounted on the textile article; and a respective control unit being mounted on the textile article and electrically connected to the light-emitting device assembly, and comprising a signal receiver; and a plurality of sub-data-processing apparatuses which each is linked to the server through the network and corresponds to one of the smart clothing apparatuses;

wherein the main data processing apparatus is operated by an asker to wireless transmit an inquiry information to the server, each sub-data-processing apparatus downloads the inquiry information from the server, the inquiry information comprises a plurality of selection data and a plurality of light color data, each selection datum corresponds to one of the light color data, each sub-data-processing apparatus receives the inquiry information, displays the plurality of selection data, and is operated by one of a plurality of answers to transmit in a short distance communication protocol, responsive to a selection signal corresponding to one of the selection data, the light color datum corresponding to said one selection datum to the corresponding control unit, the corresponding control unit receives the light color datum through the signal receiver thereof and drives the connected light-emitting device assembly to emit at least one color light in accordance with the received light color datum, the short distance communication protocol is one selected from the group consisting of a Bluetooth protocol, a Wi-Fi protocol, an LTE protocol, IEEE 802.11-based protocols, a Zigbee protocol, and a Z-wave protocol.

5. The social networking system of claim 4, wherein each sub-data-processing apparatus sends the light color datum back to the server.

6. The social networking system of claim 4, wherein each light-emitting device assembly comprises one selected from the group consisting of a light-emitting device, an organic light-emitting device and an electro-luminescent light device.

7. The social networking system of claim 4, wherein each sub-data-processing apparatus transmits the light color datum in an infrared signal way or a radiation signal way.

* * * * *